(12) United States Patent
Booth (10) Patent No.: US 7,184,667 B2
(45) Date of Patent: Feb. 27, 2007

(54) WAKE-ON LAN DEVICE (75) Inventor: Bradley J. Booth, Austin, TX (US)

(73) Assignee: Intel Corporation, Santa Clara, CA (US)

(*) Notice: Subject to any disclaimer, the term of this patent is extended or adjusted under 35 U.S.C. 154(b) by 757 days.

(21) Appl. No.: 10/147,671

(22) Filed: May 16, 2002

(65) Prior Publication Data

US 2003/0215243 A1 Nov. 20, 2003

(51) Int. Cl.
H04B 10/00 (2006.01)

(52) U.S. Cl. .................. 398/135; 398/140; 398/197

(58) Field of Classification Search ............ 398/22–24, 398/38, 130, 135, 140, 197
See application file for complete search history.

(56) References Cited

U.S. PATENT DOCUMENTS

| | | | | |
|---|---|---|---|---|
| 2002/0019954 A1* | 2/2002 | Tran | ............... | 713/600 |
| 2002/0027690 A1* | 3/2002 | Bartur et al. | ............... | 359/152 |
| 2002/0046355 A1* | 4/2002 | Takeuchi | ............... | 713/320 |
| 2003/0179711 A1* | 9/2003 | Huff | ............... | 370/248 |
| 2004/0003296 A1* | 1/2004 | Robert et al. | ............... | 713/300 |

FOREIGN PATENT DOCUMENTS

| | | | |
|---|---|---|---|
| EP | 0685948 | | 12/1995 |
| EP | 08516 | * | 7/1998 |
| EP | 0851615 | | 7/1998 |
| JP | 59039132 | | 3/1984 |
| JP | 62128261 | | 6/1987 |

OTHER PUBLICATIONS

Apr. 15, 2002 IEEE, Supplement to Carrier Sense Multiple access with Collision Detection (CSMA/CD) Access Method and Physical Layer Specifications-Media Access Control (MAC) Parameters, Physical Layer, and Management Parameters for 10 Gb/s Operation, P802.3ae/D4.3, clauses 45-52.
"Alert Standard Format (ASF) Specification," Ver. 1.03, Jun. 20, 2001, 83 pages.
"Wake up to Wake-on-Lan", International Business Machines, 11 pages.
Intel 82559 10/100 Mbps East Ethernet Controller product brief, 2 pages.
Intel TXN13200/01 Optical Transceiver, 2 pages.
Advanced Configuration and Power Interface Specification, Rev. 1.0b, Feb. 2, 1999, chapters 1-3.
International Search Report and Written Opinion of the International Searching Authority; Dated Jan. 20, 2006; PCT/US03/12904 (Intel Ref: P13878PCT), 6 pgs.
TW Application No. 092113224 (Intel Ref: P13878TW) Office Action mailed Aug. 5, 2004, 1 pg.

* cited by examiner

Primary Examiner—Dzung Tran
(74) Attorney, Agent, or Firm—Grossman, Tucker, Perreault & Pfleger, PLLC (57) ABSTRACT

Disclosed are a device and method of powering down an optical transceiver coupled to an optical transmission medium. A data transceiver may be coupled to transmit data between the optical transceiver and a media independent interface (MII). The data transceiver comprises logic to power down at least a portion of the optical transceiver in response to detection of a power down condition.

24 Claims, 4 Drawing Sheets

WAKE-ON LAN DEVICE

BACKGROUND

1. Field

The subject matter disclosed herein relates to data transmission devices. In particular, the subject matter disclosed herein relates to data transmission devices for transmitting data in or receiving data from an optical transmission medium.

2. Information

Environmental regulations have imposed restrictions on the rate of power consumption of processing platforms and networking equipment. Such equipment may transition to one or more power states as defined in the Advanced Configuration and Power Interface (ACPI) upon detecting an event or condition. For example, a processing platform may transition to a lower power state and resume to a full power condition upon detection of an event.

Networking devices employed in processing platforms and networking equipment typically consume a substantial portion of the overall power consumed by such systems. Additionally, these systems typically increase consumption as they incorporate networking devices for higher rates of data transmission.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to"one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions. Such storage devices may comprise any type of media capable of storing data including, for example, optical, semiconductor or magnetic storage media. However, these are merely an examples of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-readable instructions stored in a memory in combination with processing circuitry to execute such machine-readable instructions. However, these are merely examples of structures which may provide logic and embodiments of the present invention are not limited in these respects.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a peripheral device and a host processing system, and embodiments of the present invention are not limited in these respects.

A "data bus" as referred to herein relates to circuitry for transmitting data between devices. For example, a data bus may transmit data between a host processing system and a peripheral device. However, this is merely an example and embodiments of the present invention are not limited in this respect. A "bus transaction" as referred to herein relates to an interaction between devices coupled in a bus structure wherein one device transmits data addressed to the other device through the bus structure.

A "multiplexed data bus" as referred to herein relates to a data bus that is capable of transmitting data among two or more devices coupled to the multiplexed data bus. A multiplexed data bus may transmit data messages to a device coupled to the multiplexed data bus according to an address associated with device or a position on the multiplexed data bus where the device is coupled. However, this is merely an example of a multiplexed data bus and embodiments of the present invention are not limited in this respect.

A "serial link" as referred to herein relates to circuitry to transmit data between devices. A serial link may provide point to point communication between two devices in either unidirectionally or bi-directionally. Being limited to transmitting data between two points, a serial link may transmit data between the devices independently of address information. However, these are merely examples of a serial link and embodiments of the present invention are not limited in this respect.

An "optical transmission medium" as referred to herein relates to a transmission medium that is capable of transmitting light energy in an optical signal which is modulated by a data signal that is recoverable by demodulating the optical signal. For example, an optical transmission medium may comprise fiber optic cabling coupled between a transmitting point and a receiving point. However, this is merely an example of an optical transmission medium and embodiments of the present invention are not limited in this respect.

An "optical transceiver" as referred to herein relates to a device adapted to be coupled to an optical transmission medium and is capable of transmitting data in or receiving data from the optical transmission medium. For example, an optical transceiver may transmit data between an optical transmission medium and a communication device coupled to the optical transceiver at an interface. However, this is merely an example of an optical transceiver and embodiments of the present invention are not limited in these respects.

A "data transceiver" as referred to herein relates to a device capable of transmitting and receiving data in on or more data transmission formats. For example, a data transceiver may comprise circuitry to transmit or receive data in a data transmission format associated with a particular transmission medium. However, this is merely an example of a data transceiver and embodiments of the present invention are not limited in this respect.

A "signal detect signal" as referred to herein relates to a signal which is indicative of a presence or absence of a signal on a transmission medium. For example, a signal detect signal may have a status that is determined by a detection of a presence or absence of a signal received on a transmission medium. However, this is merely an example of a signal detect signal and embodiments of the present invention are not limited in this respect.

A "media independent interface" (MII) as referred to herein relates to an interface to receive data from source or transmit data to a destination in a format which is independent of a particular transmission medium for transmitting the data. For example, a data transceiver may transmit data to a transmission medium in a data transmission format in response to data received at an MII. Also, a data transceiver may provide data to an MII in response to receiving data from a transmission medium in a data transmission format. However, these are merely examples of an MII and embodiments of the present invention are not limited in these respects.

A "device driver" as referred to herein relates to a process hosted on a processing system to facilitate communication between a peripheral device and one or more other processes hosted on the processing system. For example, a device driver may define one or more data items common with other processes on the processing system to enable data to be transmitted to or received from a peripheral device. However, this is merely an example of a device driver and embodiments of the present invention are not limited in this respect.

A "power state" as referred to herein relates to a state in which a processing platform, or subsystem of a processing platform, may consume power. For example, a "reduced power state" may define a state at which power consumption of a device may be reduced from power consumption at a "full power state." From a reduced power state, the device may "resume" (or be restored) to a full power in response to a condition or event. However, these are merely examples of a power state, full power state, reduced power state and a resume, and embodiments of the present invention are not limited in this respect.

A "power management system" as referred to herein relates to a combination of hardware and software resources in a processing platform to place one or more subsystems of the processing platform in a reduced power state, and cause the one or more subsystems to resume to a full power state in response to a condition or event ("power down condition"). However, this is merely an example of a power management system and embodiments of the present invention are not limited in this respect.

A "sleep message" as referred to herein relates to a message provided to a subsystem of a processing platform to place the subsystem in a reduced power state. For example, a device driver may place an associated device in a reduced power state in response to a sleep state. However, this is merely an example of a sleep message and embodiments of the present invention are not limited in this respect.

A "communication adapter" as referred to herein relates to a device which may be coupled to a transmission medium to transmit data to or receive data from other devices coupled to the transmission medium. For example, a communication adapter may comprise a network adapter adapted to transmit data to or receive data from devices coupled to a network such as a local area network. Such a network adapter may be communicate with the other devices according to any one of several data communication formats such as, for example, communication formats according any of the IEEE standard 802.3, asynchronous transfer mode (ATM), synchronous optical network (SONET) or synchronous digital hierarchy (SDH) standards. In alternative embodiments, a communication adapter may comprise any one of other I/O devices such as, for example, an adapter to a data storage system. However, these are merely examples of a communication adapter and embodiments of the present invention are not limited in these respects.

Briefly, an embodiment of the present invention relates to device and method of powering down an optical transceiver coupled to an optical transmission medium. A data transceiver may be coupled to transmit data between the optical transceiver and a media independent interface (MII) where the data transceiver comprises logic to power down at least a portion of the optical transceiver in response to detection of a power down condition. However, this is merely an example embodiment and other embodiments of the present invention are not limited in these respects.

Figure 1:
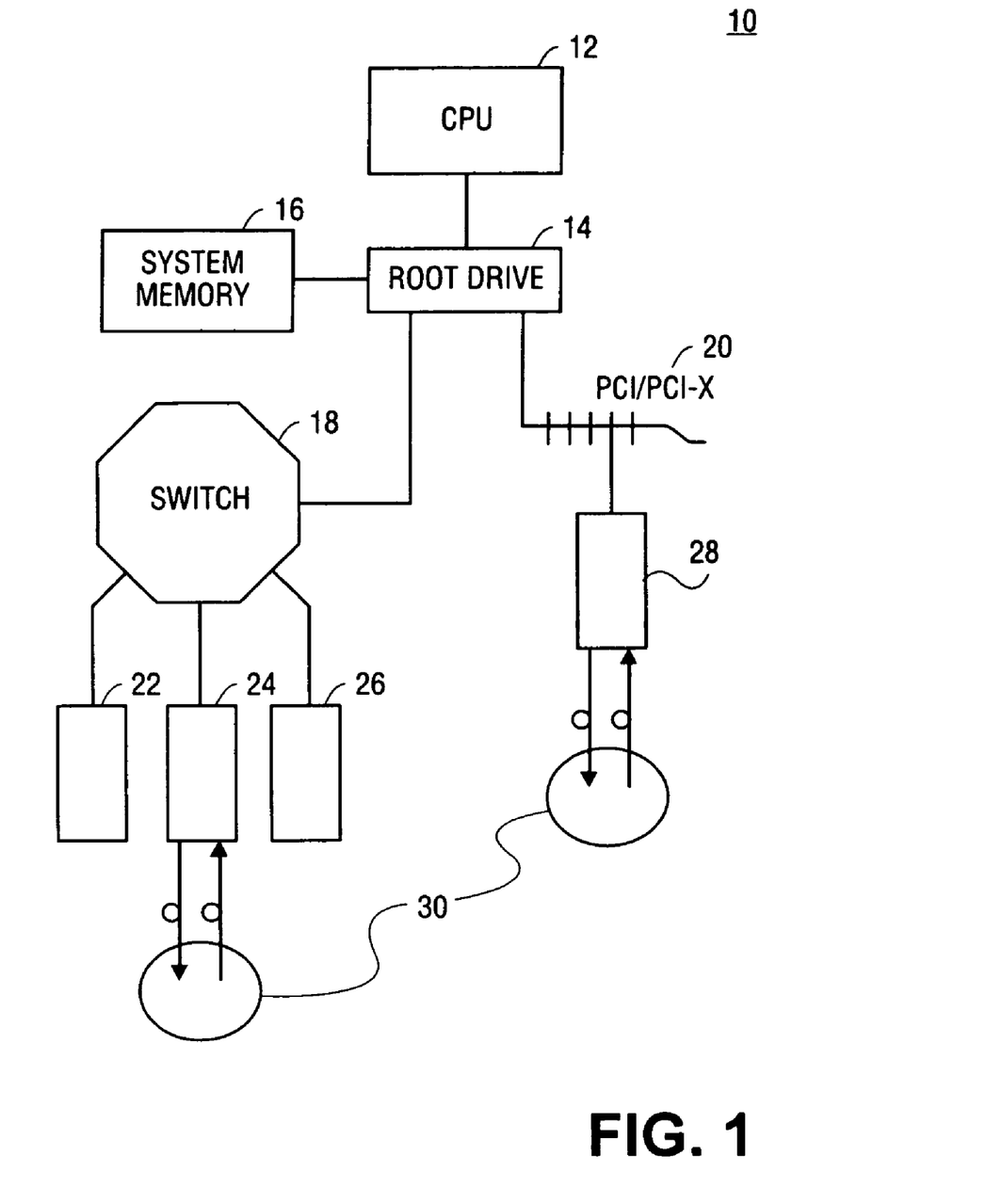
FIG. 1 shows a schematic diagram of a processing platform according to an embodiment of the present invention.

FIG. 1 shows a schematic diagram of a processing platform 10 according to an embodiment of the present invention. A central processing unit (CPU) 12 and system memory 16 are coupled to a root device 14 to provide a host processing system. A basic input/output system (BIOS) (not shown) may load firmware instructions to the system memory 16 to be executed by the CPU 12 in response to a reset event. The firmware instructions may comprise routines to initialize the processing system by, for example, loading an operating system and device drivers to the system memory 16 from a non-volatile memory device (not shown).

A switch 18 and a multiplexed data bus 20 are coupled to the host processing system through the root device. The switch 18 may comprise a switch fabric to facilitate peer-to-peer message routing among devices coupled to the switch 18 at ports coupled to the devices by serial links independent of the root device 14. The multiplexed data bus 20 may comprise a bus structure formed according to the Peripheral Components Interconnect (PCI) data bus as provided in the PCI Local Bus Specification Rev. 2.2, Dec. 18, 1998 (hereinafter the "PCI Local Bus Specification"). However, these are merely examples of how peripheral devices may be coupled to communicate with a host processing system and embodiments of the present invention are not limited in this respect.

Devices coupled to the switch 18 or multiplexed data bus 20 may include communication adapters 24 or 28 to transmit data to or receive data from an optical transmission medium 30. For example, the communication adapters 24 and 28 may be coupled to communicate with a network according to a communication protocol such as Ethernet protocols set forth in 100BASE-F, 1000BASE-SX, 1000BASEL-LX, 10 Gigabit Ethernet or 40 Gigabit Ethernet set forth in versions of IEEE standard 802.3. In other embodiments, the communication adapters 24 and 26 may be adapted to transmit or receive data according to other communication protocols such as, for example, SONET or Fibrechannel. However, these are merely examples of communication protocols that may be used to transmit data in or receive data from an optical transmission medium and embodiments of the present invention are not limited in these respects.

The processing platform 10 may comprise a power management system comprising one or processes hosted on the CPU 12 and system memory 16 to communicate with one or more subsystems of the processing platform 10. For example, the power management system may place the subsystems in a reduced power state by providing sleep messages to the subsystems in response to detecting one or more events or conditions resulting in a power down condition. The power management system may cause the subsystems to subsequently resume to a full power state in response to other events. For example, the power management system may place the processing platform 10 in a reduced power state in response to detecing a user input from a mechanical interface (not shown) or detecing an absence of activity at the CPU 12 (e.g., absence of interrupt signals from I/O devices). From the reduced power state, the power management system may transition one or more subsystems of the processing platform 10 to a full power state in response to, for example, a user input from the mechanical interface or detection of an interrupt to the CPU 12. The power management system may be formed according to the Advanced Configuration and Powers Interface (ACPI) as illustrated in the ACPI Specificaiton, Rev. 1.0b, Feb. 2, 1999 (hereinafter the "ACPI Specification") and/or the Alert Standard Format (ASF) Specification, Ver. 1.03, Jun. 20, 2001 (hereinafter the "ASF Specification"). However, these are merely examples of a power management system that may be employed in a processing platform and embodiments of the present invention are not limited in these respects.

The communication adapters 24 and 28 may communicate with processes hosted on the host processing system (of the CPU 12 and system memory 16) using read or write transactions. The CPU 12 and system memory 16 may host one or more device drivers that initiate transactions to communicate with the communication adapters 24 and 28. For example, a device driver may initiate a write transaction addressed to either the communication adapter 24 or 28 to provide data in registers defined at an interface with the device. Additionally, the communication adapters 24 and 28 may initiate write transactions to provide data to data buffers in the system memory 16. However, these are merely examples of how a peripheral device may communicate with processes hosted on a processing system and embodiments of the present invention are not limited in these respects.

Figure 2:
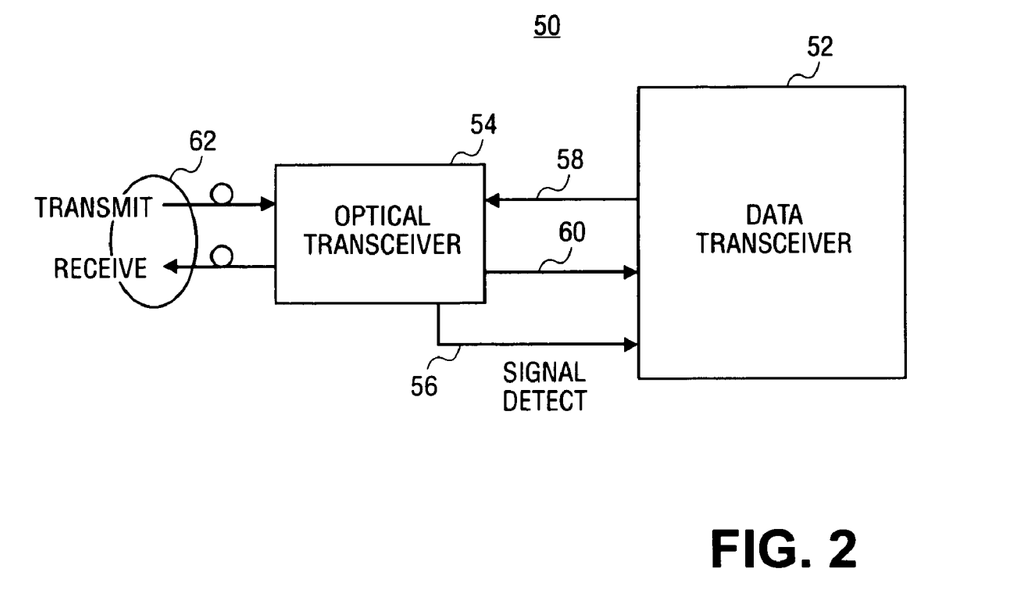
FIG. 2 shows a schematic diagram of a communication adapter for receiving data from and transmitting data to an optical transmission medium according to an embodiment of the optical communication adapters shown in FIG. 1.

FIG. 2 shows a schematic diagram of a communication adapter 50 for receiving data from and transmitting data to an optical transmission medium according to an embodiment of the communication adapters shown in FIG. 1. An optical transceiver 54 is coupled to an optical transmission medium 62 to transmit data to or receive data from an optical transmission medium 62 according to an optical transmission format such as, for example, wavelength division multiplexing (WDM) or multi-amplitude signaling (MAS). For example, a transmitter portion (not shown) of the optical transceiver 54 may employ WDM for transmitting multiple "lanes" of data in the optical transmission medium 62. Similarly, a receiver portion (not shown) may employ wave division de-multiplexing of a received signal to recover each of the data lanes. However, this is merely an example of an optical transmission format and embodiments of the present invention are not limited in this respect.

The optical transceiver 54 may comprise a transmitter section (not shown) to transmit data signals through the optical transmission medium and a receiver section (not shown) to receive and process data received from the optical transmission medium. The transmitter section may comprise, for example, one or more laser driver circuits and laser devices to transmit an optical signal on the optical medium 62 in response to the serial data signal 58 received from the data transceiver 52. The receiver section may comprise, for example, one or more photodiodes and transimpedence amplifiers to provide the serial data signal 60 to the data transceiver 52 in response to an optical signal received on the optical transmission medium 62. However, these are merely examples of a receiver section and a transmitter section which may be included in an optical transceiver, and embodiments of the present invention are not limited in these respects.

A data transceiver 52 may be coupled to the optical transceiver 54 to receive and process a serial data signal 60, and provide signals at an MII (not shown) in response to the serial data signal 60. The data transceiver 52 may comprise a serializer/deserializer (SerDes) circuit (not shown), and clock and data recovery circuitry (not shown) to process the serial data signal 60. The data transceiver 52 may also provide the serial data signal 58 to the optical transceiver 54 in response to receipt of signals at the MII.

The optical transceiver 54 and the data transceiver 52 may transition between power states depending on, for example, a power state associated with the processing platform 10 or the presence/absence of signals being received from the optical transmission medium 62. The optical transceiver 54 may generate a signal detect signal 56 to indicate the presence or absence of a signal being received at the optical transceiver 54 from the optical transmission medium 62. In response to receipt of a message to place the device in a reduced power state (e.g., a sleep message from a device driver hosted on the processing platform 10), the data transceiver 52 may cause the optical transceiver 54 to transition to a reduced power state. If there is no signal is being received from the optical transmission medium, the data transceiver may then transition itself to a reduced power state.

According to an embodiment, the power state of the optical transceiver 54 may controlled such that power may be removed from the transmitter section while the receiver section receives sufficient power to detect a signal received from the optical transmission medium 62. The optical transceiver 54 may therefore be placed in a reduced power state that enables detection of signals received at the optical transmission medium 62 and generation of the signal detect signal 56 to alert the data transceiver 52 of the presence of a signal. However, this is merely an example of how an optical transceiver may transition to a reduced power state and embodiments of the present invention are not limited in this respect.

From the reduced power state, the data transceiver 52 and optical transceiver 54 may resume to a full power state in response to detection of a signal on the optical transmission medium 62 at the optical transceiver 54. In response to the signal detect signal 56 indicating the presence of a signal being received from the optical transmission medium 62, the data transceiver 52 may resume to a full power state. Upon resuming to the full power state, the data transceiver 52 may cause the optical transceiver 54 to resume to the full power state through a control signal interface.

According to an embodiment, the communication adapter 50 may be compliant with the IEEE P.802.3ae for 10 gigabit per second data transmission in the optical medium 62 (IEEE P.802.3ae—Media Access Control (MAC) Parameters, Physical Layer and Management Parameters for 10 Gb/s Operation, Apr. 15, 2002, hereinafter the "10 Gigabit Ethernet Specification"). Accordingly, the data transceiver 52 may comprise a physical media attachment (PMA) sublayer (as provided in clause 51 of the 10 Gigabit Ethernet Specification) to transmit data between the optical transceiver 54 and a 10 Gigabit MII ("XGMII") (as provided in clause 46 of the 10 Gigabit Ethernet Specification). Correspondingly, the optical transceiver 54 may comprise a physical medium dependent ("PMD") sublayer to transmit data between the data transceiver 52 and a media dependent interface ("MDI") with the optical transmission medium 62 (as provided in clause 52 of the 10 Gigabit Ethernet Specification).

The data transceiver 52 may be coupled to a media access controller (MAC) at an MII. Alternatively, the data transceiver 52 comprise a MAC coupled to an MII as an integrated controller which may be coupled to a multiplexed data bus, serial link or switch fabric. However, these are merely examples of how a data transceiver may be integrated with a MAC and embodiments of the present invention are not limited in these respects.

In the presently illustrated embodiment, the signal detect signal 56 may be provided as a SIGNAL_DETECT indication as provided in a PMD sublayer interface (e.g. "PMD_SIGNAL.indicate" as provided in clause 52.1.1.3 of the 10 Gigabit Ethernet Interface). For example, the optical transceiver 54 may generate the SIGNAL_DETECT signal to indicate the presence of a received signal at the MDI in response to detecting a presence of a received signal on one or more wave division demultiplexed data lanes. However, this is merely an example of how an optical transceiver may detect a presence of a received signal from an optical transmission medium and embodiments of the present invention are not limited in this respect.

The optical transceiver 54 may comprise a Management Data Input/Output ("MDIO") Interface as provided in clause 45 of the 10 Gigabit Ethernet Specification to receive control signals. The MDIO may define one or more control registers to control the power state of the optical transceiver 54 to be in a full power state, or one or more reduced power states. For example, clause 45.2.1.8 of the 10 Gigabit Ethernet Specification defines an MDIO control register 1.9 having a global transmit disable field 1.9.0 that may be used power down a transmitter portion of the optical transceiver in response to a power down condition. Accordingly, the power state of the optical transceiver 54 may be externally controlled through a device having access to the MDIO such as, for example, the data transceiver 52. However, this is merely an example of how the power state of an optical transceiver may be externally controlled and embodiments of the present invention are not limited in these respects.

Figure 3:
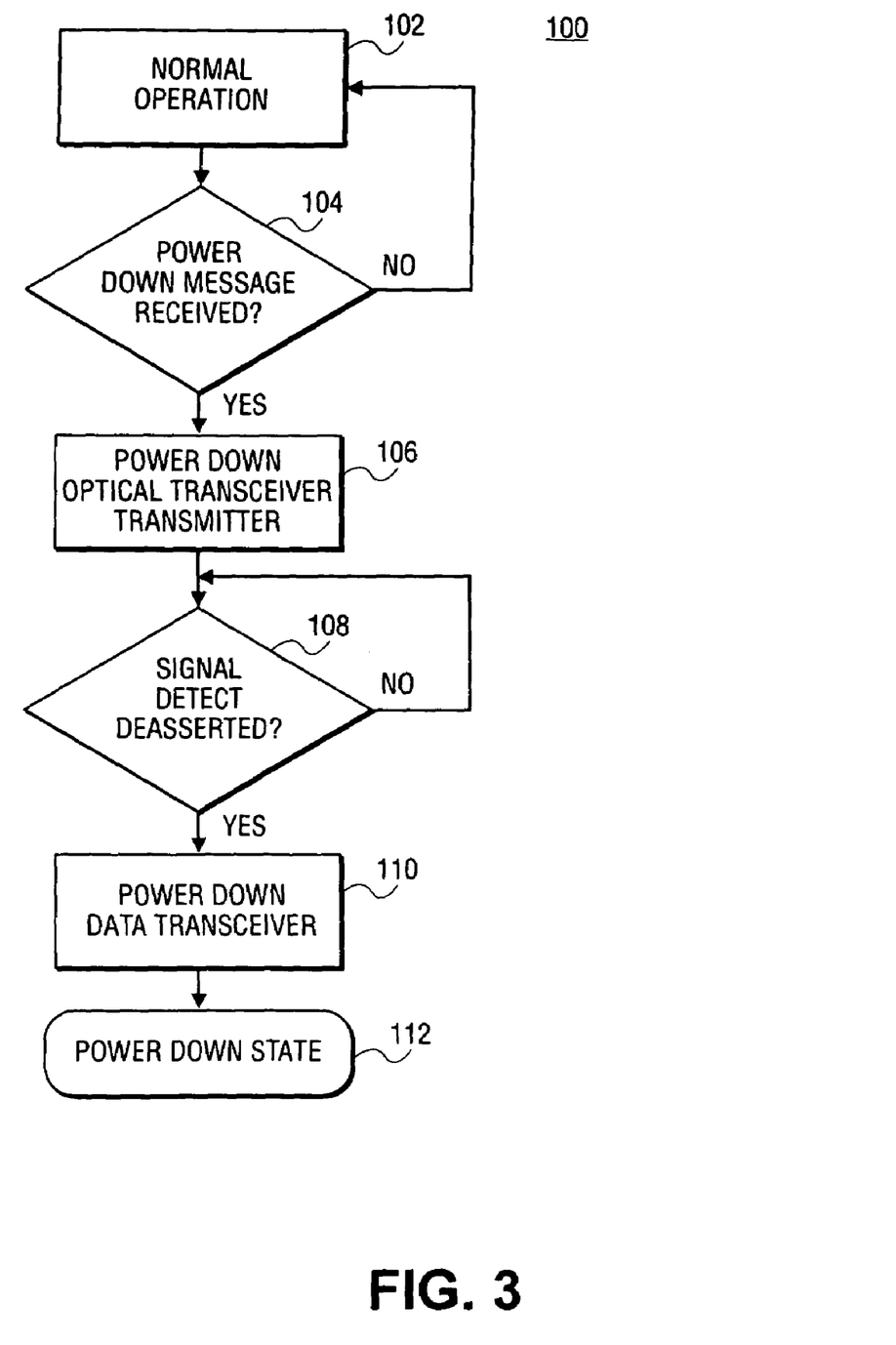
FIG. 3 shows a flow diagram illustrating a process placing portions of an optical communication adapter in a reduced power state according to an embodiment of the optical communication adapter shown in FIG. 2.

FIG. 3 shows a flow diagram illustrating a process of placing portions of a communication adapter in a reduced power state according to an embodiment of the communication adapter shown in FIG. 2. At diamond 104, the data transceiver 52 receives a message to transition the communication adapter 50 to a reduced power state. Such a message may comprise a sleep message generated by, for example, a device driver responding to a power down event. At block 106, the data transceiver 52 may then power down a portion of the optical transceiver 54 (e.g., power down a transmitter portion while maintaining sufficient power in a receiver portion to detect presence of signal on the transmission medium 62). The data transmission device 52 may cause the optical transceiver 54 to transition to the reduced power state at block 106 by, for example providing a power down command in an MDIO. At diamond 108, if the signal detect signal 56 indicates that no signal is being received at the optical transceiver 54 from the medium 62, the data transceiver 52 may transition to a reduced power state at block 110.

Figure 4:
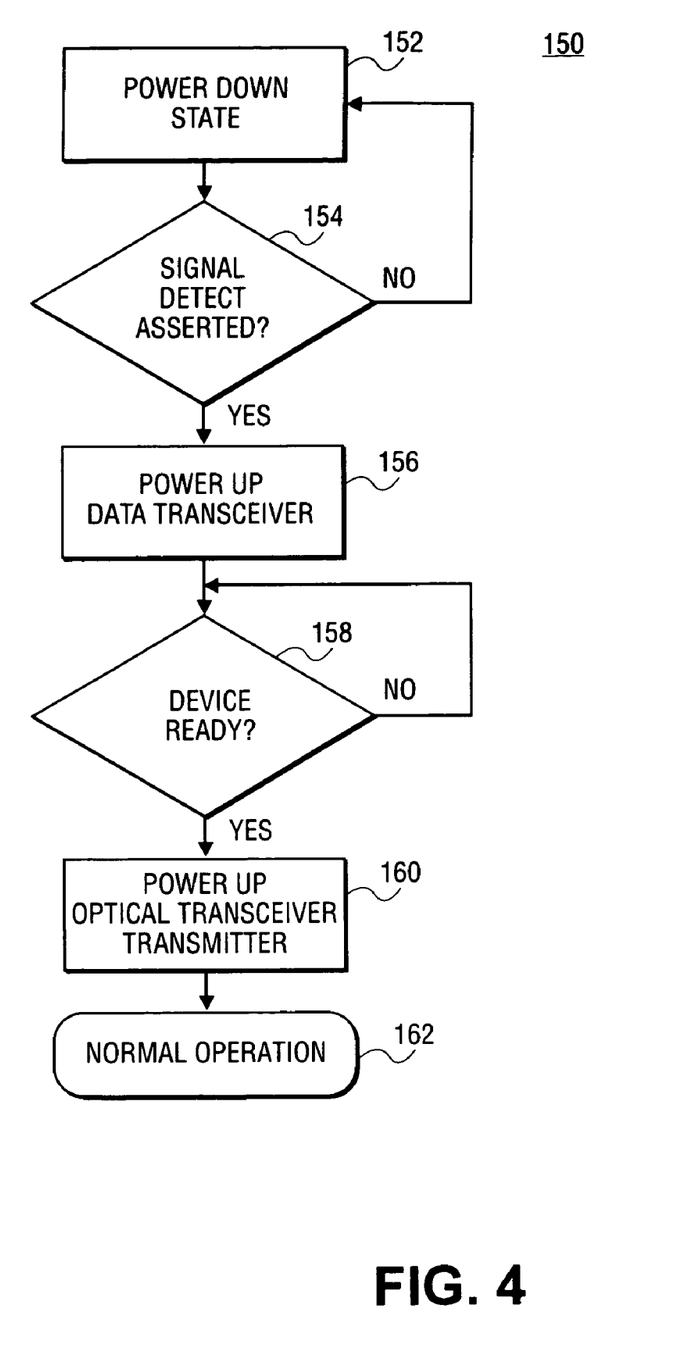
FIG. 4 shows a flow diagram illustrating a process of resuming portions of an optical communication adapter to a fill power state according to an embodiment of the optical communication adapter shown in FIG. 2.

FIG. 4 shows a flow diagram illustrating a process of resuming portions of a communication adapter to a full power state according to an embodiment of the communication adapter shown in FIG. 2. At block 152, the optical transceiver 54 and the data transceiver 52 may be in a reduced power state. In this reduced power state, a receiver section of the optical transceiver 54 may be sufficiently powered to detect the presence of signal being received on the optical transmission medium. In response to an indication of the presence of a signal being received at the optical transceiver 54 from the signal detect signal 56 (e.g., in response to detection of a signal detected at an MDI), the data transceiver 52 may resume itself to a full power state at block 156. Upon resuming to a full power state at diamond 158, the data transceiver 52 may cause the optical transceiver (e.g., through message in an MDIO) to resume to the full power state at block 160 (e.g., restore power to a transmitter portion of the optical transceiver 54).

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
    an optical transceiver adapted to transmit data in or receive data from an optical transmission medium;
    a data transceiver coupled to transmit data between the optical transceiver and a media independent interface (MII), the data transceiver comprising logic to power down at least a portion of the optical transceiver in response to detection of a power down condition and logic to selectively power down the data transceiver in response to a status of a signal detect signal from the optical transceiver;

wherein the optical transceiver comprises a transmitter section and a receiver section; and wherein the data transceiver comprises logic to place the transmitter section in a removed power state while maintaining sufficient power at the receiver section to detect a presence of a signal from the optical transmission medium.

2. The apparatus of claim 1, wherein the optical transceiver comprises an MDIO interface and the data transceiver comprises logic to access the MDIO to remove power from the optical transceiver.

3. The apparatus of claim 1, wherein the data transceiver further comprises logic to restore power to the data transceiver in response to a status of a signal detect signal from the optical transceiver.

4. The apparatus of claim 3, wherein the data transceiver further comprises logic to restore power to the optical transceiver in response to resuming to a full power state.

5. The apparatus of claim 4, wherein the optical transceiver comprises an MDIO interface and the data transceiver comprises logic to access the MDIO interface to restore power to the optical transceiver.

6. A system comprising:
a processing system; and
a communication adapter coupled to the processing system, the communication adapter comprising:
an optical transceiver adapted to transmit data in or receive data from an optical transmission medium;
a data transceiver coupled to transmit data between the optical transceiver and a media independent interface (MII), the data transceiver comprising logic to power down at least a portion of the optical transceiver in response to detection of a power down condition at the processing system and logic to selectively power down the data transceiver in response to a status of a signal detect signal from the optical transceiver;
wherein the optical transceiver comprises a transmitter section and a receiver section; and
wherein the data transceiver comprises logic to place the transmitter section in a removed power state while maintaining sufficient power at the receiver section to detect a presence of a signal from the optical transmission medium.

7. The system of claim 6, the system further comprising a multiplexed data bus to couple the communication adapter to the processing system.

8. The system of claim 6, the system further comprising a serial link to couple the communication adapter to the processing system.

9. The system of claim 6, wherein the communication adapter further comprises a media access controller coupled to the data transceiver at the MII and coupled to the processing system through one of a multiplexed data bus and a serial link.

10. The system of claim 6, wherein the system further comprises a swicth fabric to couple the communication adapter to the processing system.

11. The system of claim 6, wherein the optical transceiver comprises an MDIO interface and the data transceiver comprises logic to access the MDIO to remove power from the optical transceiver.

12. The system of claim 6, wherein the data transceiver further comprises logic to restore power to the data transceiver in response to a status of a signal detect signal from the optical transceiver.

13. The system of claim 12, wherein the data transceiver further comprises logic to restore power to the optical transceiver in response to resuming to a full power state.

14. The system of claim 13, wherein the optical transceiver comprises an MDIO interface and the data transceiver comprises logic to access the MDIO interface to restore power to the optical transceiver.

15. A method comprising:
detecting a power down condition at a data transceiver, the data transceiver being adapted to transmit data between an optical transceiver and a media independent interface (MII);
powering down a portion of the optical transceiver in response to detecting the power down condition, wherein the optical transceiver comprises a transmitter section and a receiver section, and wherein power down the portion of the optical transceiver includes placing the transmitter section in a removed power state while maintaining sufficient power at the receiver section to detect a presence of a signal from the optical transmission medium in response to detecting the power down condition; and
selectively powering down the data transceiver in response to a status of a signal detect signal from the optical transceiver.

16. The method of claim 15, wherein the optical transceiver comprises an MDIO interface, and wherein the method further comprises accessing the MDIO to remove power from the optical transceiver.

17. The method of claim 15, the method further comprising restoring power to the data transceiver in response to a status of a signal detect signal from the optical transceiver.

18. The method of claim 17, the method further comprising restoring power to the optical transceiver in response to the data transceiver resuming to a full power state.

19. The method of claim 18, wherein the optical transceiver comprises an MDIO interface, and wherein the method further comprises accessing the MDIO interface to restore power to the optical transceiver.

20. An apparatus comprising:
means for detecting a power down condition at a data transceiver, the data transceiver being adapted to transmit data between an optical transceiver and a media independent interface (MII);
means for powering down a portion of the optical transceiver in response to detecting the power down condition;
wherein the optical transceiver comprises a transmitter section and a receiver section;
means for placing the transmitter section in a removed power state while maintaining sufficient power at the receiver section to detect a presence of a signal from the optical transmission medium in response to detecting the power down condition; and
means for selectively powering down the data transceiver in response to a status of a signal detect signal from the optical transceiver.

21. The apparatus of claim 20, wherein the optical transceiver comprises an MDIO interface, and wherein the apparatus further comprises means for accessing the MDIO to remove power from the optical transceiver.

22. The apparatus of claim 20, the apparatus further comprising means for restoring power to the data transceiver in response to a status of a signal detect signal from the optical transceiver.

23. The apparatus of claim 22, the apparatus further comprising means for restoring power to the optical transceiver in response to the data transceiver resuming to a full power state.

24. The apparatus of claim 23, wherein the optical transceiver comprises an MDIO interface, and wherein the apparatus further comprises means for accessing the MDIO interface to restore power to the optical transceiver.

* * * * *

UNITED STATES PATENT AND TRADEMARK OFFICE
CERTIFICATE OF CORRECTION

PATENT NO. : 7,184,667 B2 Page 1 of 1
APPLICATION NO. : 10/147671
DATED : February 27, 2007
INVENTOR(S) : Booth It is certified that error appears in the above-identified patent and that said Letters Patent is hereby corrected as shown below:

In column 9, line 58, in Claim 10, delete "swicth" and insert -- switch --, therefor.

Signed and Sealed this

Eighth Day of July, 2008

JON W. DUDAS
*Director of the United States Patent and Trademark Office*